US009643791B2

(12) United States Patent
Landler et al.

(10) Patent No.: US 9,643,791 B2
(45) Date of Patent: May 9, 2017

(54) DEVICE AND METHOD FOR ORIENTING NONCIRCULAR CONTAINERS

(71) Applicant: KRONES AG, Neutraubling (DE)

(72) Inventors: Bruno Landler, Neutraubling (DE); Markus Schönfelder, Regensburg (DE); Fabian Kolbinger, Neutraubling (DE); Sebastian Baumgartner, Neutraubling (DE); Reiner Glötzl, Pentling (DE)

(73) Assignee: KRONES AG, Neutraubling (DE)

( * ) Notice: Subject to any disclaimer, the term of this patent is extended or adjusted under 35 U.S.C. 154(b) by 0 days.

(21) Appl. No.: 14/910,513

(22) PCT Filed: Jun. 27, 2014

(86) PCT No.: PCT/EP2014/063674
§ 371 (c)(1),
(2) Date: Feb. 5, 2016

(87) PCT Pub. No.: WO2015/018564
PCT Pub. Date: Feb. 12, 2015

(65) Prior Publication Data
US 2016/0176651 A1 Jun. 23, 2016

(30) Foreign Application Priority Data

Aug. 9, 2013 (DE) .................. 10 2013 215 794

(51) Int. Cl.
*B65G 21/20* (2006.01)
*B65G 47/14* (2006.01)
(Continued)

(52) U.S. Cl.
CPC .......... *B65G 47/244* (2013.01); *B65D 1/0223* (2013.01); *B65G 21/2054* (2013.01);
(Continued)

(58) Field of Classification Search
CPC ...... B65G 21/20; B65G 47/14; B65G 47/244; B65G 51/03
(Continued)

(56) References Cited

U.S. PATENT DOCUMENTS 1,959,123 A * 5/1934 Chapman ................ F25D 25/04
198/481.1
3,462,001 A * 8/1969 Boyce ................ B65G 47/2445
198/415

(Continued)

FOREIGN PATENT DOCUMENTS

CA 2494622 A1 3/2004
CN 101811620 A 8/2010
(Continued)

OTHER PUBLICATIONS

International Search Report for Application No. PCT/EP2014/063674, mailed Oct. 31, 2014.
(Continued)

*Primary Examiner* — Douglas Hess
(74) *Attorney, Agent, or Firm* — Marshall, Gerstein & Borun LLP

(57) ABSTRACT

Device and a corresponding method for orienting containers having a noncircular cross-section, in particular bottles, which are transported along a transport path by way of neck handling, the device including at least one rotary device arranged along the transport path, the rotary device being stationary and including one or more stationary resilient rotary elements which are suitable for orienting a container in a specified direction.

18 Claims, 4 Drawing Sheets

(51) Int. Cl.
*B65G 51/03* (2006.01)
*B65G 47/244* (2006.01)
*B65D 1/02* (2006.01)
*B65G 43/08* (2006.01)

(52) U.S. Cl.
CPC ......... *B65G 21/2072* (2013.01); *B65G 43/08* (2013.01); *B65G 47/2445* (2013.01); *B65G 51/035* (2013.01); *B65G 2201/0247* (2013.01)

(58) Field of Classification Search
USPC ........ 198/394, 395, 400, 411, 415, 416, 617
See application file for complete search history.

(56) References Cited

U.S. PATENT DOCUMENTS

| | | | | |
|---|---|---|---|---|
| 3,833,110 | A * | 9/1974 | Riggs | B65G 21/2072 198/459.4 |
| 4,147,249 | A * | 4/1979 | Tourres | B65G 47/28 198/459.1 |
| 4,464,884 | A * | 8/1984 | Franks | B65B 59/02 198/415 |
| 4,465,175 | A * | 8/1984 | Caldwell | B65G 47/244 198/399 |
| 4,930,615 | A * | 6/1990 | Nash | B65G 47/244 198/411 |
| 5,074,400 | A * | 12/1991 | Focke | B65B 35/58 198/415 |
| 5,115,903 | A * | 5/1992 | Leander | A22C 25/12 198/400 |
| 5,181,598 | A * | 1/1993 | Lashyro | B65G 47/244 198/377.1 |
| 5,388,707 | A * | 2/1995 | Stivison | B07C 5/124 198/389 |
| 5,788,049 | A * | 8/1998 | Ardison | B65G 47/252 198/408 |
| 5,823,317 | A * | 10/1998 | Bankuty | B65G 47/244 198/379 |
| 6,155,408 | A * | 12/2000 | Heuft | B65G 47/244 198/456 |
| 6,293,736 | B1 | 9/2001 | Farquhar | |
| 6,913,136 | B2 * | 7/2005 | van den Dungen | A22C 17/0093 198/389 |
| 7,014,032 | B2 * | 3/2006 | Franzaroli | B65G 47/24 198/376 |
| 8,037,993 | B2 * | 10/2011 | Pedrazzini | G01N 35/00732 198/394 |
| 8,157,084 | B2 * | 4/2012 | Begin | B65G 47/244 198/376 |

FOREIGN PATENT DOCUMENTS

| | | |
|---|---|---|
| CN | 102725212 A | 10/2012 |
| CN | 203411020 U | 1/2014 |
| CN | 203581942 U | 5/2014 |
| DE | 3239541 A1 | 4/1984 |
| DE | 3016940 C2 | 5/1985 |
| DE | 60125727 T2 | 11/2007 |
| EP | 1122195 A1 | 8/2001 |
| EP | 1546010 B1 | 5/2010 |
| EP | 2489614 A1 | 8/2012 |
| GB | 2490505 A | 11/2012 |
| JP | 2010265113 A | 11/2010 |

OTHER PUBLICATIONS

Notification of First Office Action for application No. 201480045336.8, dated Sep. 23, 2016.

* cited by examiner

DEVICE AND METHOD FOR ORIENTING NONCIRCULAR CONTAINERS

The present application is the US National Phase of International Patent Application No. PCT/EP2014/063674, filed Jun. 27, 2014, which application claims priority to German Patent Application No. 102013215794.0, filed Aug. 9, 2013. The priority application, DE 102013215794.0, is hereby incorporated by reference.

BACKGROUND

The present invention relates to a device and a method for orienting noncircular containers, such as bottles, within the framework of container treatment.

PRIOR ART

Orientation devices for orienting containers that are transported on conveyor belts are known from prior art. For example, DE 32 39 541 A1 shows friction elements that are mounted on one side adjacent to a conveyor belt and toward which a container to be oriented is pressed and made to rotate until it has reached a certain position. For this purpose, the container is inclined on the conveyor belt and is prevented from tilting by a supporting surface. If the container is not properly oriented, then it is acted upon by a torque when contacting a friction element so that it is rotated until it is in the correct position and no longer in contact with the friction element. Due to the required inclined position of the container, such devices are unsuitable for orienting containers transported by way of neck handling.

EP 2 489 614 A1 discloses a transport device in which containers are transported by way of neck handling. Stationary guide rails are provided which guide the containers that are transported by way of neck handling along the intended transport path. This guiding is only partly, if at all, suitable for selectively orienting the containers in a certain direction, but instead already requires correctly oriented containers.

Furthermore, DE 601 25 727 T2 as well shows transportation of containers by way of neck handling. In order to there cause orientation of the containers, movable comb-like formed plates are disposed on both sides along the transport path. In order to orient a container, the container is positioned in a corresponding cup and the formed plates are moved toward one another, and furthermore against each other in the opposite direction, so that a container is rotated in the cup. The entire set-up is complex and can not be used for high container transport speeds.

SUMMARY OF THE DISCLOSURE

The present disclosure is directed to providing a method and a device for orienting containers that are moved in transport paths by way of neck handling at high speeds where the method can be performed easily and with little constructive effort and operates even at high container transport speeds without the risk of damaging the containers.

The device according to the invention for orienting containers having a noncircular cross-section, in particular bottles, which are transported along a transport path by way of neck handling, comprises at least one rotary device arranged along the transport path and is characterized in that the rotary device is stationary and comprises one or more stationary resilient rotary elements which are suitable for orienting a container in a specified direction. The configuration of a respective rotary device with one, preferably a plurality of stationary resilient rotary elements is there a passive orienting device, whereby orienting the containers is achieved only by their own translatory movement and the torque caused by the rotary elements, which significantly reduces the risk of incorrect positioning and discard. Resilient is in this context to mean that the rotary elements being deflected by a passing container return to their original position only by a restoring force (for example, a spring that is compressed when the containers passes) and any additional motors can thereby be dispensed with.

According to one embodiment, two rotary devices are provided which are arranged on both sides of the transport path. This ensures even better and more reliable orienting of the containers.

Furthermore, the rotary elements can be arranged at a distance b perpendicular to the center of the transport path. The center of the transport path is there understood to mean the set of points in the direction of transport having the same distance from the left and the right edge of the transport path. This applies both for rectilinear and for curved transport paths. This embodiment of the invention keeps a passage in the device free of rotary elements which the containers can pass without obstruction.

The device is in one embodiment characterized in that the rotary elements are formed to be resilient between a minimum distance a/2 and a maximum distance d/2 from the center of the transport path. It is by a suitable selection of distances a/2 and D/2 achieved that virtually any container, regardless of its shape, can by this orienting device be oriented in the desired specified orientation or direction.

In a further embodiment of the device, the rotary element comprises at least one spring element. It can by suitable selection of the spring elements be achieved that containers to be oriented experience a torque corresponding to the degree of misalignment and can therefore be rotated faster to the desired position.

The rotary element in another embodiment comprises at least one of a friction wheel, a belt, a chain. Better results in orienting can be obtained by way of these further embodiments of the rotary elements, depending on the purpose.

It can further be provided that the rotary elements comprise at least two friction surfaces having different friction coefficients. By additionally providing friction surfaces on the rotary elements, an additional torque can be applied to a misaligned container, whereby the latter can be more effectively turned into the desired position.

The device can according to one embodiment be characterized in that a stabilizing device is provided in the direction of transport of the containers downstream of the rotary device and is adapted to prevent a container from further rotating. It is by providing this additional stabilizing device achieved that properly formed [sic] containers do not resume rotating, which could lead to renewed misalignment.

In one embodiment, the rotary elements are adapted to exert torques of different magnitudes onto a container. These torques of different magnitudes can be used, for example, to exert the greatest possible initial torque on misaligned containers when entering the device for orienting, so that they are correctly oriented within a shorter distance or in a shorter period of time, whereas toward the end of the orienting device, for example, only low torques are exerted upon misaligned containers to make only minor adjustments.

In a further embodiment, the rotary elements can be controlled by a control unit. For example, the position of the rotary elements can there be controlled or the retaining force with which, for example, the spring elements exert the torque upon the container to be oriented.

It can further be provided that sensors for determining the orientation of a container are provided which are suitable to pass a signal being indicative of the orientation of a container to the control unit, where the control unit is adapted to control the rotary elements in dependence of the signal. These sensors can comprise, for example, pressure sensors, and the control unit can if necessary change, for example, the position of the rotary elements in order to achieve more effective orientation of the containers by transmitting larger torques.

When using, for example, one of these devices, a method for orienting containers having a noncircular cross-section, in particular bottles, which are transported along a transport path by way of neck handling can be realized, where the method is characterized in that a stationary rotary device with one or a plurality stationary resilient rotary elements, which are suitable for orienting a container in a specified direction, is disposed on one side along the transport path. Orientation of containers can with this method be performed in a manner much more free of errors as compared to prior art.

The method can also comprise that the rotary elements during a deflection operation move between a minimum distance a/2 and a maximum distance d/2 perpendicular to the center of the transport path in dependence on the position of the container to be deflected For example, spring elements can be deflected (by contacting the container). Due to the fact that the spring elements yield, a respective torque is simultaneously applied to the container which is all the greater, the further the spring elements are deflected.

The method is in one embodiment characterized in that the containers are after leaving the rotary device by a stabilizing device prevented from further rotating. This achieves that the containers are transported off having the correct orientation, whereby they can be supplied to further treatment steps.

In one embodiment, different rotary elements can transmit maximum torques of different magnitudes to a container. The method for orienting the containers can thus be modified depending on the requirements and be adapted to the mass or the dimensions of the container to be oriented.

In one embodiment of the method, the movement of the rotary elements is controlled by a control unit and/or sensors determine the orientation of a container and deliver a signal being indicative of the orientation of the container to the control unit which controls the rotary elements in dependence of this signal. Controlling the rotary elements on the basis of sensor data is there automated, whereby intervention of an operator can be minimized and modification of the device for orienting can occur much faster in dependence of certain process parameters.

Furthermore, a spring element comprising a spring arm, an axis of rotation with which the spring element can be rotatably mounted, and an integrated magnet and is characterized in that the spring element can be used in a device according to one of the above embodiments.

DETAILED DESCRIPTION

Figure 1:
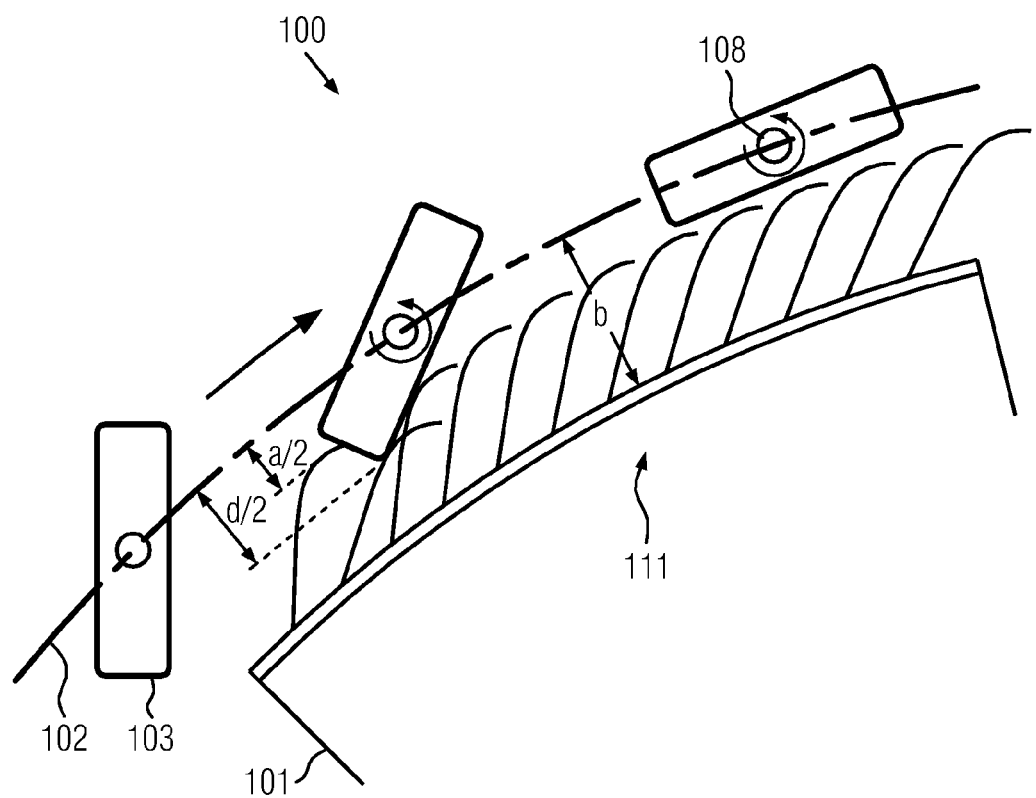
FIG. 1 is a schematic representation of the general operating principle of the device according to the invention.

FIG. 1 is a schematic representation of a device 100 according to the invention. Containers 103 are transported along a transport path. The transport path can there basically be shaped as desired. It can in particular be a linear conveyor (conveyor belt). But curved transport paths are also considerable in which the containers are transported, for example, around a curve. The containers have a noncircular cross-sectional profile, can therefore, for example, have an oval or rectangular shape. All cross-sections are in principle suitable which have at least two different dimensions. In the case of a rectangular cross-section, this would be the edge lengths of the rectangle or the diagonals. In the case of an oval container cross-section, the semi-axes. Transportation is performed preferably by way of neck handling. For this purpose, devices—presently not shown but sufficiently known—such as air guides or retaining clips are provided which can grip the container at the bottle neck. The container is guided such that it is freely rotatable. To prevent unwanted turning of the container 103 to be transported, it can be provided that the container is fixed prior to reaching the beginning 101 of device 100 for orienting so that additional rotations are not possible. At the latest when reaching beginning 101 of device 100, however, this fixation is released so that the containers can basically be rotated about their center axis 108. For this purpose, device 100 for orienting containers comprises at least one rotary device 111 disposed on one side of transport path 102. It is basically provided as being stationary, i.e. the position of said rotary device 111 does not change even when individual components can move. Rotary device 111 is equipped with a plurality of rotary elements, as shall be further explained with reference to FIG. 2. The configuration of rotary device 111 and in particular of the rotary elements contained therein is basically such that they can move in a passive manner in dependence of the position of a container, i.e. without motor action. The rotary elements are preferably formed to be resilient so that movement occurs in the resilient region, where the rotary elements, however, continue to be stationary. Resilient shall presently in particular mean that the rotary elements due to a restoring force return to their initial position after a container has passed them, where the restoring force is caused not by a motor but by the energy stored in the rotary element after having contacted the container. An example of this is the temporary compression of a spring which returns to its original shape once it is no longer acted upon by an external force. The movement of the rotary elements is therefore caused by the container themselves which are guided along transport path 102 through device 100. It is intended that the rotary elements are mounted at a distance b from the center of transport path 102.

It can furthermore be provided that the rotary elements contained in rotary device 111 can move resiliently such that their distance from the centerline of transport path 102 during transport of a container 103 through it can be increased from a value a/2 to a value d/2. Although the maximum distance d/2 is not restricted to the maximum dimensions of a container transported through device 100, it is nevertheless intended that the maximum distance is at least as great as half the maximum diameter of a container guided through device 100. This maximum diameter of a container 103 is there defined by the largest distance between two points located on the edge of the container in a plane parallel to the container transport plane shown in FIG. 1. The maximum distance of the rotary elements from the centerline of transport path 102 can be greater, but not less. There is basically no restriction to the minimum distance a/2, even if it is advantageous to have this distance a/2 be only so great that a properly oriented container can pass rotary device 111 without contacting.

Orientation of a container 103 being guided through device 100 is at least partly caused by the fact that a torque in accordance with Newton's third law acts upon it that corresponds to or depends on the force transferred by it to the rotary elements during transportation through rotary device 111.

Figure 2A:
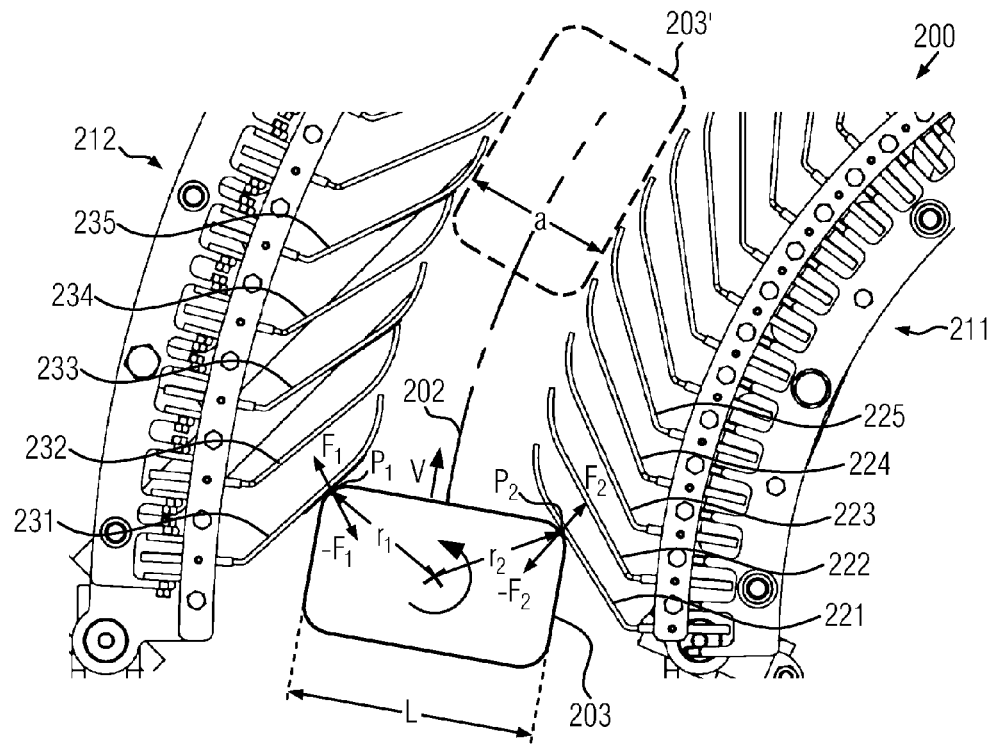
FIG. 2a is a schematic representation of an embodiment of the device with spring elements.
Figure 2B:
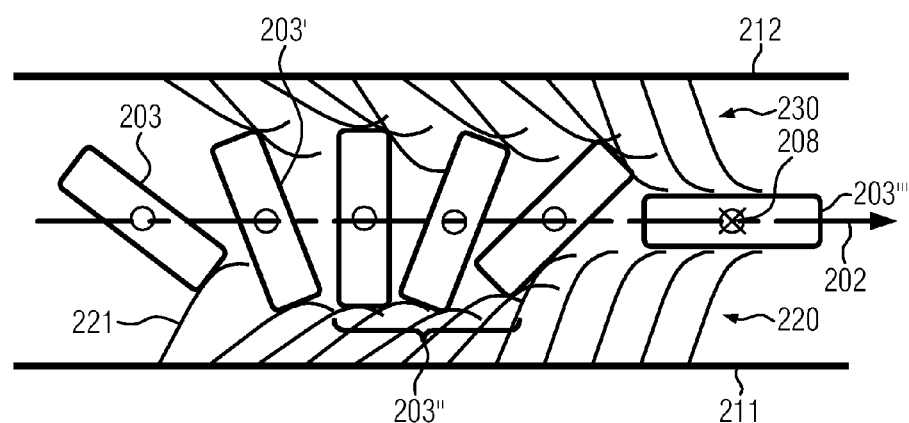
FIG. 2b is a time-lapse schematic representation of an embodiment of the device with spring elements, illustrating how a single container is rotated via the device from a random orientation to a desired final orientation.

FIGS. 2a and 2b show a further embodiment of the device according to the invention. Two rotary devices 211 and 212 are there provided, one of which is arranged on the left side and one on the right side of transport path 202. The rotary elements being provided in every rotary device 211 and 212 are in this embodiment spring members 221 225 and 231 235, respectively. If an incorrectly oriented container 203 enters these devices 211 and 212, then it contacts these rotary elements due to its incorrect orientation and hence larger dimensions L, as compared to the minimum distance a of the rotary elements. Since it moves at a certain speed v along transport path 202, container 203 exerts a force $\vec{F}$ onto each of spring elements 221-225 on the one side, provided it contacts them. According to Newton's third law, a respective force $-\vec{F}$ acts upon container 203. Since container 203 is transported by way of neck handling and is movably supported, a rotation about center axis 208 of the container can occur, as illustrated there with reference to the arrow directions. Accordingly, a torque $M_1 = -\vec{r}_1 \times \vec{F}_1$ or $M_2 = -\vec{r}_2 \times \vec{F}_2$, respectively, acts upon the container in dependence of the point $P_1$ or $P_2$ of contact with rotary elements 231 and 221. Provided that the sum of all torques acting upon the container 203 is unequal zero, then the container experiences a rotation such that it is rotated to a new position. The most stable orientation of the container in this system corresponds to that in which the lowest overall torque acts upon it. Due to the channel with distance a between the ends of the spring elements which is left free between devices 211 and 212, a preferred direction or orientation of the container can there be defined in which it experiences minimum torque and is therefore oriented accordingly. It is therefore with no additional use of a motor achieved that each incoming container 203 is after passing through rotary devices 211 and 212 correctly oriented according to container 203' illustrated in dashed lines. Since all other orientations of container 203 not corresponding to orientation 203' (or rotated by 180°) have a higher torque, the container will after passing through the plurality of spring elements 221-225 and 231-235 have been forced into the global torque minimum and accordingly exhibit orientation 203' or the orientation rotated by 180°, so that it can be supplied to further treatment devices. In order to reinforce this alignment effect, it can be provided that the distance of the spring elements of a rotary device differ at random in a small range by a certain value h. The formation of local torque minima, in which the container could remain, can thereby be suppressed.

A corresponding entire process for orienting a container 203 is shown schematically in FIG. 2b. Container 203 having a random orientation reaches a first spring element 221. Caused by the latter, container 203 experiences a first rotation and is guided to a first rotated position 203'. It then contacts further spring elements of the plurality of spring elements 220 and 230 of rotary devices 211 and 212, so that it experiences further torques which via intermediate orientations 203'' lead it to a final orientation 203''' corresponding to the desired orientation in which container 203''' experiences only minimum torque. If the end of rotary devices 211 and 212 has in this position not yet been reached, then further rotations can occur in the event that devices 211 and 212 have a curvature, where, however, the container is rotated out from its stable minimum in orientation 203''' only to a small degree and also again slips back into this orientation.

Figure 3:
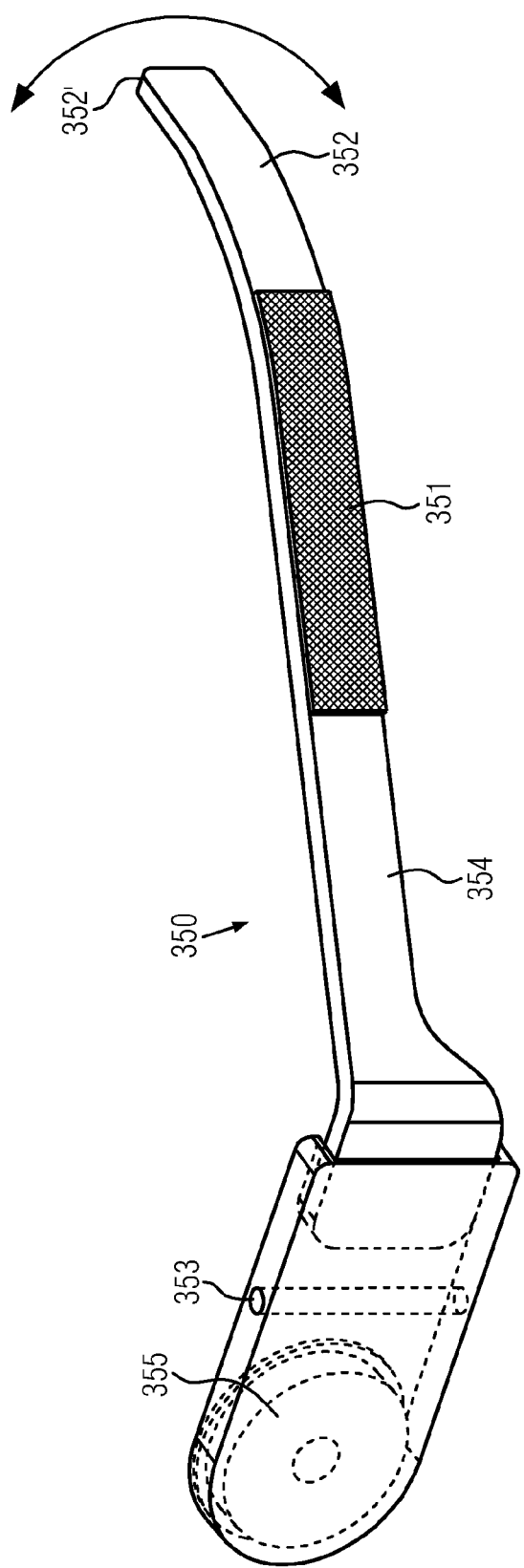
FIG. 3 is a detailed perspective view of a spring element.

FIG. 3 shows an embodiment of spring elements 350 shown in FIGS. 2a and b. This spring element comprises a spring arm 354 which projects into the transport path of the containers, as shown in FIG. 2. Spring arm 354 is mounted rotatable about an axis of rotation 353, where the spring constant arises from the strength of an integrated magnet 355. The stronger this magnet, the more force is needed to deflect the spring by a certain distance or to rotate it about an axis of rotation 353, respectively. In order to increase the effect upon not properly positioned containers, it can further be provided that spring arm 354 comprises at least two different surfaces 351 and 352. Surface 352 covering a portion of the tip of spring arm 354 can exhibit a very low friction coefficient, so that a container contacting spring arm 354 at this surface slides past the latter without experiencing any substantial torque that would deflect it away from its current position. This is advantageous because a properly oriented container touches spring arm 354 at this point, if at all. A second surface 351 can be provided having a coating with a significantly higher friction coefficient. A large torque (as compared to contacting tip 352) is thereby applied to a container at this point contacting the spring arm, whereby the container is rotated to a different position. It can also be provided that the friction coefficient changes along spring arm 354 according to a predetermined function. It can, for example, increase continuously depending on the distance to tip 352' of spring arm 354, for example, via a linear relationship or any other functional relationship. It can thereby be achieved that a torque acts upon not properly oriented containers which is all the greater the more the orientation of the container deviates from the desired orientation, without there being any need for controlling the spring elements by motors or the like. An initially incorrectly oriented container is therefore first moved roughly into the correct orientation by a strong movement, where the subsequent finer adjustment of the orientation is achieved by contacting parts of spring arm 354 having a lower friction coefficient.

Figure 4A:
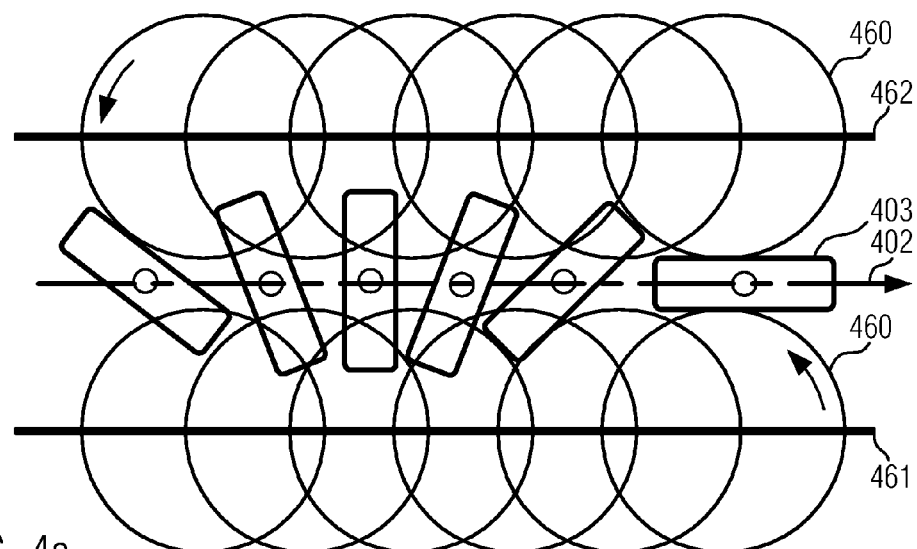
FIG. 4a is a schematic top representation of a device according a second embodiment of the present disclosure, in which wheels are employed to change the orientation of a container.
Figure 4B:
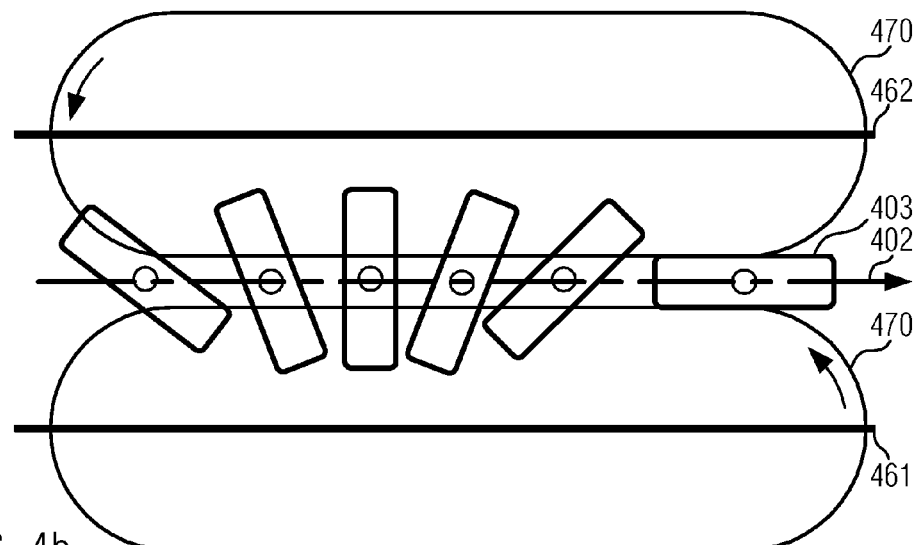
FIG. 4b is a schematic top representation of a third embodiment of the present disclosure, in which circulating chains or belts are employed to change the orientation of a container.

FIGS. 4a and 4b show further embodiments of the rotary elements, as they do not need to be restricted to spring elements. FIG. 4a illustrates a number of wheels 460 which can be arranged only on one or on both sides of transport path 402. The wheels are rotatably mounted on an axle 461 and 462 on both sides of transport path 402. The respective rotary device there comprises a plurality of wheels 460 on either side. They can be formed as friction wheels, i.e. have a high friction coefficient. It can there as well be advantageous if the friction coefficient of each friction wheel varies in dependence of the position along transport path 402. It can be very large at the beginning of the device for orienting and further decrease in the direction of transport of the containers. The friction wheels on both sides of transport path 402 preferably rotate in the same direction, so that a container is forced into a specific orientation. The friction wheels can be driven by separate motors (one for each friction wheel) or by a common motor. It can likewise be provided that the friction wheels, similarly to the above-described spring elements, are moved to rotate only by the force transmitted by the containers when passing. It can further be advantageous to have the distance between the friction wheels of the device disposed to the left and the right of transport path 402 be variable, so that they can be deflected or pushed away by an incorrectly oriented container, whereby canting is prevented. This can be achieved, for example, by mounting the friction wheels with springs which are compressed when a container pushes away a friction wheel and where the friction wheel returns to its initial position after a container has passed. The friction wheels are then in this sense configured to be resilient. Spacing control via a motor can there also be advantageous when the device is to be used for orienting containers of different sizes. In order to be able to increase the number of friction wheels per device, they can be arranged in the direction of the longitudinal axis of the container that is transported therethrough or offset from each other perpendicular to the transport plane, so that one friction wheel can be arranged in the vertical direction with an offset to its adjacent friction wheels.

FIG. 4b shows a further embodiment of the invention in which circulating chains or belts 470 are instead of the friction wheels arranged in rotary devices 461 and 462 on the left and the right of transport path 402. There as well, rotation can be effected by motors or by contacting containers. The chains can be provided both on one said as well as on both sides. Since the chain rotates along the entire device, the use of different friction coefficients is there not advised. However, it can there as well be provided that the chain can be deformed by a slanted container or pushed away from the center of the transport path, respectively, such that greater torque can act upon the container It is sufficient to have the belt or the chain be made of sufficiently elastic material, for example rubber, which is by a misaligned container then pushed away and thereby stretched. Due to the tension in the belt, the belt returns to its initial shape due to relaxation after the container has passed the device.

Figure 4C:
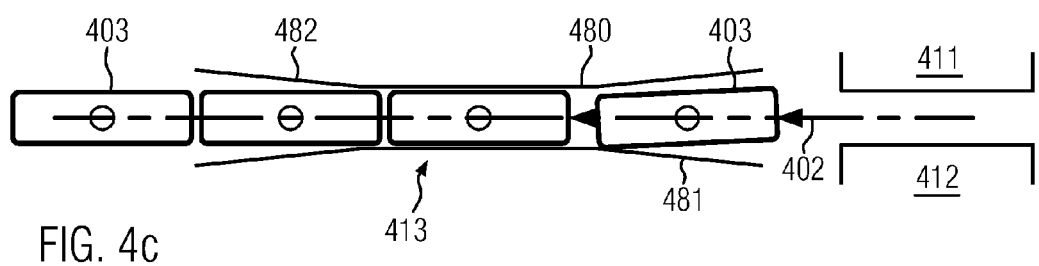
FIG. 4c is a schematic illustration of a stabilizing device of the present disclosure, having an inlet region, a central region, and an outlet region.

FIG. 4c furthermore shows an additional stabilizing device 413 which can be provided, for example, at the end of the device for orienting according to the invention with rotary devices 411 and 412 on the two sides. This stabilizing device 413 can comprise an inlet region 481 which is so wide that it can also accommodate containers 403 which are turned slightly relative to the ideal orientation. This region is followed by a further central region 480, the dimensions of which differ only slightly, for example, 1 cm, preferably less than 5 mm, from those of an ideally oriented container so that the properly oriented containers are correctly aligned when entering stabilizing device 413. Further rotations are then prevented by the stabilizing device 413. Outlet region 482 is in the exit direction of containers 403 also open, so that no forces which could cause turning act upon the container after it leaves the stabilizing device.

A control unit, which can control the rotary devices, can basically be provided in any of the embodiments illustrated. Sensors can furthermore be provided which detect, for example, the size of a container and increase or decrease the distance between the rotary elements of the rotary devices from each other in order to achieve the maximum effect in orienting the container. It can furthermore be provided that the control device is adapted to control the maximum or minimum torques acting upon the containers. This can by use of the spring elements shown in FIGS. 2 and 3 be implemented, for example, such that the magnet is configured as an electromagnet, just like its corresponding counterpart. It can then be achieved by controlling the power supply of the electromagnets that the spring element or each spring element is harder or easier to deflect since the spring constant of the entire spring element can be determined by the strength of the electromagnet. Since the force acting back upon the container or the torque largely depends thereon, this presently gives rise to very effective control of the behavior of each rotary element of the rotary devices. Also when using friction wheels, adjustment of the rotational speed of each friction wheel and its deflectability perpendicular to the direction of transport of the containers can be advantageous, as has been described with reference to FIG. 4a. When using belts or chains, also the speed at which they are moved can be adjusted.

The invention claimed is:

1. A device for orienting containers having a noncircular cross-section, in particular bottles, which are transported along a transport path by way of neck handling, comprising at least one rotary device arranged along said transport path, said rotary device being stationary and comprising one or more stationary resilient rotary elements suitable for orienting a container in a specified direction, in combination with a spring element comprising a spring arm, an axis of rotation with which said spring element can be rotatably mounted, and an integrated magnet.

2. The device according to claim 1, wherein the at least one rotary device includes two rotary devices, one of the rotary devices being arranged on a first side of the transport path and the other of the rotary devices being arranged on a second side of the transport path.

3. The device according to claim 1, one or more of the at least one rotary elements disposed at a distance b perpendicular to a center of the transport path.

4. The device according to claim 3, each of the at least one rotary elements resilient between a minimum distance a/2 and a maximum distance d/2 from the center of the transport path.

5. The device according to claim 1, the rotary element comprising at least one spring element.

6. The device according to claim 1, the rotary element comprising at least one of a friction wheel, a belt, and a chain.

7. The device according to claim 1, each of the at least one rotary elements comprising at least two friction surfaces having different friction coefficients.

8. The device according to claim 1, further comprising a stabilizing device provided in the direction of transport of the containers downstream of the rotary device and adapted to prevent a container from further rotating.

9. The device according to claim 1, each of the at least one rotary elements adapted to exert torques of different magnitudes onto a container.

10. The device according to claim 1, each of the at least one rotary elements being controllable by a control unit.

11. The device according to claim 10, further comprising sensors for determining the orientation of a container are provided which are suitable to deliver a signal indicative of the orientation of a container to the control unit, where the control unit is adapted to control said rotary elements in dependence of said signal.

12. A method for orienting containers having a noncircular cross-section, in particular bottles, which are transported along a transport path by way of neck handling, and which are transported without defined orientation, where a stationary rotary device with one or a plurality of stationary resilient rotary elements orienting a container in a specified direction is disposed at least on one side along said transport path, the stationary rotary device comprising a spring element comprising a spring arm, an axis of rotation with which said spring element can be rotatably mounted, and an integrated magnet.

13. The method according to claim 12, and moving the rotary elements during a deflection operation between a minimum distance a/2 and a maximum distance d/2 perpendicular to the center of the transport path in dependence of the position of the container to be deflected.

14. The method according to claim 12, and stabilizing the containers after leaving the rotary device by a stabilizing device, preventing the containers from further rotating.

15. The method according to claim 12, the different rotary elements exerting torques of different magnitudes onto a container.

16. The method according to claim 12, and controlling movement of the rotary elements by a control unit.

17. The method according to claim 12, and determining via one or more sensors an orientation of a container and delivering a signal indicative of the orientation of the container to the control unit which controls the rotary elements in dependence of said signal.

18. A device for orienting containers having a noncircular cross-section, in particular bottles, which are transported along a transport path by way of neck handling, comprising at least one rotary device arranged along said transport path, said rotary device being stationary and comprising one or more stationary resilient rotary elements suitable for orienting a container in a specified direction, each of the at least one rotary elements being controllable by a control unit, further comprising sensors for determining the orientation of a container are provided which are suitable to deliver a signal indicative of the orientation of a container to the control unit, where the control unit is adapted to control said rotary elements in dependence of said signal.

* * * * *